United States Patent
Jia et al.

(10) Patent No.: US 9,219,800 B2
(45) Date of Patent: Dec. 22, 2015

(54) METHOD AND SYSTEM FOR A WEB SERVER TRANSMITTING A RESPONSE TO AN ACCESS REQUEST

(71) Applicant: International Business Machines Corporation, Armonk, NY (US)

(72) Inventors: Bin Jia, Hampshire (GB); Ying Liu, Beijing (CN); E Feng Lu, Beijing (CN); Yan Rong Shen, Beijing (CN); Jia Wu, Beijing (CN); Zhen Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/939,613

(22) Filed: Jul. 11, 2013

(65) Prior Publication Data
US 2014/0040347 A1 Feb. 6, 2014

(30) Foreign Application Priority Data

Jul. 31, 2012 (CN) .......................... 2012 1 0269626

(51) Int. Cl.
*H04L 29/08* (2006.01)
*H04L 29/06* (2006.01)
*G06F 11/36* (2006.01)
*G06F 11/30* (2006.01)
*H04L 12/26* (2006.01)

(52) U.S. Cl.
CPC ............... *H04L 67/42* (2013.01); *G06F 11/30* (2013.01); *G06F 11/3688* (2013.01); *H04L 43/00* (2013.01)

(58) Field of Classification Search
CPC .. G06F 11/3684; G06F 11/3414; H04L 67/42
See application file for complete search history.

(56) References Cited

U.S. PATENT DOCUMENTS

| 5,600,789 | A | * | 2/1997 | Parker et al. ............... 714/38.11 |
| 5,724,273 | A | * | 3/1998 | Desgrousilliers et al. .... 702/120 |
| 5,881,219 | A | * | 3/1999 | Leung et al. .................... 714/31 |
| 6,078,956 | A | * | 6/2000 | Bryant et al. ................. 709/224 |
| 6,178,449 | B1 | * | 1/2001 | Forman et al. ................ 709/224 |
| 6,286,046 | B1 | * | 9/2001 | Bryant .......................... 709/224 |
| 6,775,824 | B1 | * | 8/2004 | Osborne et al. ............... 717/125 |
| 6,993,747 | B1 | * | 1/2006 | Friedman ...................... 717/124 |
| 7,127,503 | B2 | | 10/2006 | Malrnskog |
| 7,346,807 | B1 | * | 3/2008 | Burbidge et al. ............... 714/25 |

(Continued)

OTHER PUBLICATIONS

IP.com, "Client Side Tag Library Framework for Web2.0," IBM, Jan. 24, 2008, 18 pages.

(Continued)

*Primary Examiner* — Lashonda Jacobs
(74) *Attorney, Agent, or Firm* — Cantor Colburn LLP; Rahan Uddin

(57) ABSTRACT

According to embodiments, method, systems, and computer program products are provided for a web server transmitting a response to an access request. An access request for a web application program deployed on a web server is received, where a response corresponding to the access request is composed with a script. A test script is transmitted. A response time of the test script is received. The response time includes a time that the test script is executed in a browser of a client and a time that the test script is transferred over a network. Different responses are transmitted to different types of scripts included in the response corresponding to the access request in accordance with the response time of the test script.

20 Claims, 5 Drawing Sheets

(56) References Cited

U.S. PATENT DOCUMENTS

| | | | |
|---|---|---|---|
| 7,392,321 B1* | 6/2008 | Wolf et al. | 709/232 |
| 7,877,732 B2* | 1/2011 | Day et al. | 717/124 |
| 8,229,884 B1* | 7/2012 | Bluhm | 707/608 |
| 8,490,056 B2* | 7/2013 | Lau et al. | 717/124 |
| 8,875,102 B1* | 10/2014 | Feng | 717/124 |
| 2002/0002625 A1 | 1/2002 | Vange et al. | |
| 2006/0253742 A1* | 11/2006 | Elenburg et al. | 714/38 |
| 2008/0127097 A1* | 5/2008 | Zhao et al. | 717/124 |
| 2008/0133210 A1* | 6/2008 | Chagoly et al. | 703/22 |
| 2008/0320462 A1* | 12/2008 | Bergman et al. | 717/168 |
| 2009/0006945 A1 | 1/2009 | Gumz et al. | |
| 2009/0138937 A1 | 5/2009 | Erlingsson et al. | |
| 2009/0217302 A1* | 8/2009 | Grechanik et al. | 719/320 |
| 2009/0228314 A1* | 9/2009 | Athey et al. | 705/7 |
| 2009/0265681 A1* | 10/2009 | Beto et al. | 717/100 |
| 2009/0313319 A1 | 12/2009 | Beisiegel et al. | |
| 2011/0041121 A1* | 2/2011 | Schalk | 717/127 |
| 2011/0083070 A1 | 4/2011 | Maryka et al. | |
| 2011/0107147 A1* | 5/2011 | Kesireddy | 714/33 |
| 2011/0271255 A1* | 11/2011 | Lau et al. | 717/124 |
| 2013/0024845 A1* | 1/2013 | Lanzkron et al. | 717/130 |
| 2014/0040347 A1* | 2/2014 | Jia et al. | 709/203 |

OTHER PUBLICATIONS

Nagpurkar et al., "Workload Characterization of selected JEE-based Web 2.0 Applications," The Java Enterprise Edition Platform (JEE), 10 pages.

* cited by examiner

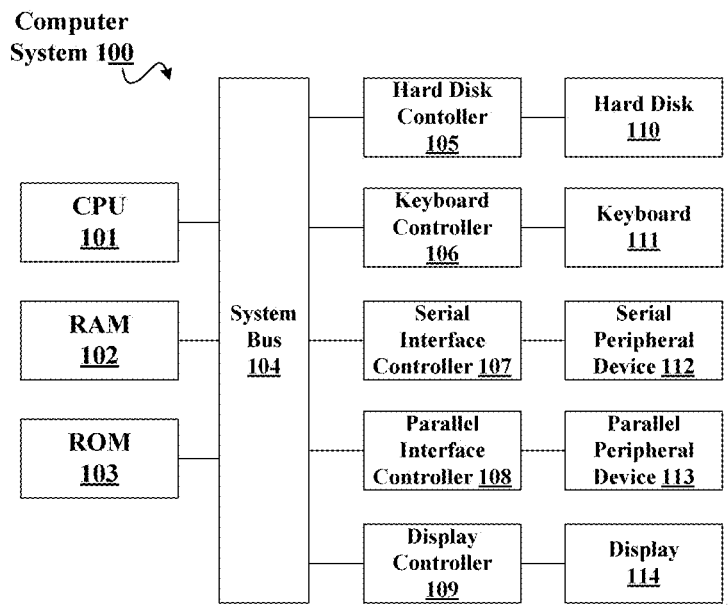

Fig. 1

Receiving an access request for a Web application program, wherein a response corresponding to the access request is composed with a script (S201)

Transmitting a test script (S202)

Receiving a response time of the test script (S203)

Transmitting different responses to different types of scripts included in the response corresponding to the access request in accordance with the response time of the test script (S204)

```
jQuery("#list2").jqGrid({
    url:'server.php?q=2',
    datatype: "json",
    colNames:['Inv No','Date', 'Client', 'Amount','Tax','Total','Notes'],
    colModel:[  {name:'id',index:'id',  width:55},  {name:'invdate',index:'invdate',  width:90},
{name:'name',index:'name asc, invdate',  width:100},  {name:'amount',index:'amount', width:80,
align:"right"},  {name:'tax',index:'tax',  width:80,  align:"right"},  {name:'total',index:'total',
width:80,align:"right"}, {name:'note',index:'note', width:150, sortable:false} ],
    rowNum:10,
    rowList:[10,20,30],
    pager: '#pager2',
    sortname: 'id',
    viewrecords: true,
    sortorder:"desc",
    caption:"JSONExample"
});
jQuery("#list2").jqGrid('navGrid','#pager2',{edit:false,add:false,del:false});
```

Fig. 3b

```
$().ready(function() {
$("#signupForm").validate({
        rules: {
   firstname: "required",
   email: {
     required: true,
     email: true
   },
   password: {
     required: true,
     minlength: 5
   },
   confirm_password: {
     required: true,
     minlength: 5,
     equalTo: "#password"
   }
},
        messages: {
   firstname: "please enter your name",
   email: {
     required: "please enter your Email address",
     email: " please enter correct email address"
   },
   password: {
     required: "please enter a password",
     minlength: jQuery.format("the password can not be less than {0} character")
   },
   confirm_password: {
     required: "please enter confirmed password",
     minlength: " the confirmed password cannot be less than 5 characters",
     equalTo: "passwords entered two times are not consistent"
   }
}
    });

/*@GUI-START@*/

....GUI java script

/*@GUI-END@*/

/*@FUNC-START@*/

....Logic java script

/*@FUNC-END@*/

METHOD AND SYSTEM FOR A WEB SERVER TRANSMITTING A RESPONSE TO AN ACCESS REQUEST

PRIORITY

The present application claims priority to China Patent Application No. 201210269626.3 filed on 31 Jul. 2012, and all the benefits accruing therefrom under 35 U.S.C. §119, the contents of which in its entirety are herein incorporated by reference.

BACKGROUND

The present invention relates to an Internet application, and more particularly, to a method and system for a web server to transmit a response to an access request.

Web 2.0 Internet application programs are currently widely used. A Web 2.0 Internet application program is a web application program which uses a response that is composed based on a script. In a session where a network client accesses a web application program based on a script composition response, the network client obtains codes of the script over the network. Parsing and rendering of the script are made via a browser of the client. Thus, in one session, a workload allocated to the client is usually determined before the session starts, and the workload allocated to the client is unchanged during the session.

In a practical application, various factors can dynamically influence the web browser of the client, thereby making an impact on an interaction effect rendered by the application program. One factor can be a real time resource allocation to the client, for example, when the client starts or ends other application programs, percentages of the real time central processing unit (CPU) and memory resources obtained by the web browser will be changed, which will make the rendered interaction effect changed. Another factor is a situation of the network, for example, when the network bandwidth is small and network speed is slow, the web browser of the client has no response from a server for a long time, and the rendered interaction effect will get poor.

SUMMARY

According to embodiments, methods, systems, and computer program products are provided for a web server transmitting a response to an access request. An access request for a web application program deployed on a web server is received, where a response corresponding to the access request is composed with a script. A test script is transmitted. A response time of the test script is received. The response time includes a time that the test script is executed in a browser of a client and a time that the test script is transferred over a network. Different responses are transmitted to different types of scripts included in the response corresponding to the access request in accordance with the response time of the test script.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 1 shows an exemplary computer system 100 which is applicable to implement the embodiments described herein;

FIG. 2 shows a flowchart of a method for a Web server transmitting a response to an access request in accordance with embodiments described herein;

FIG. 3a shows an interface to be rendered in the client by a graphical user interface (GUI) script in accordance with embodiments described herein;

FIG. 3b shows a logic script corresponding to FIG. 3a in accordance with embodiments described herein;

FIG. 4 shows an example of a logic script in accordance with embodiments described herein;

DETAILED DESCRIPTION

Figures 5, 6:
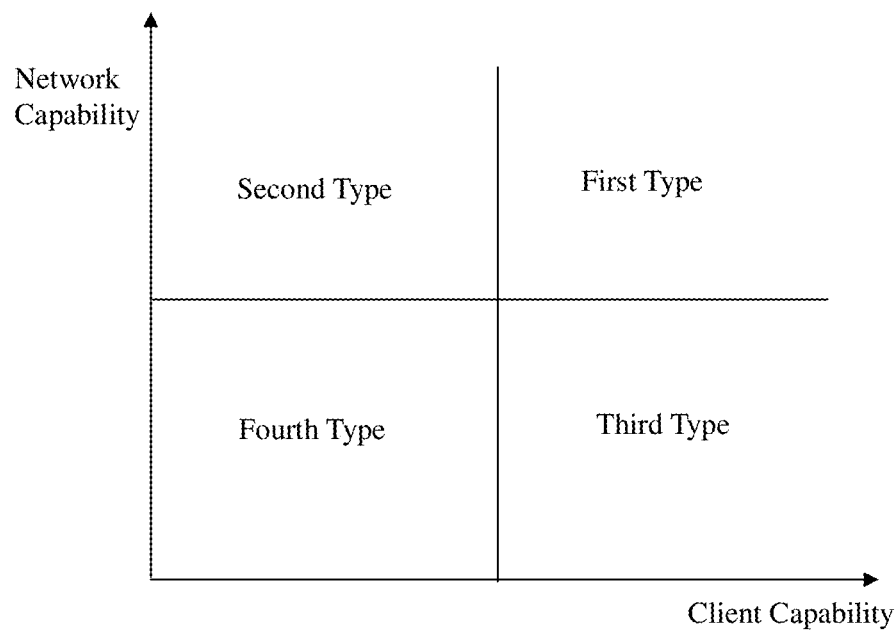
FIG. 5 shows spatial positions of four types of clients in a space of a client capability and a network capability in accordance with embodiments described herein.
FIG. 6 shows a segment of the script which schematically uses comment statement to indicate a script type in accordance with embodiments described herein.

Embodiments described herein include a web server transmitting a response to an access request which is capable of allocating a data flow between a web browser and a server, so that more types of clients can access the server.

Some embodiments are described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

FIG. 1 shows an exemplary computer system 100 which is applicable to implement the embodiments described herein. As shown in FIG. 1, the computer system 100 may include: CPU (central processing unit) 101, RAM (random access memory) 102, ROM (read only memory) 103, system bus 104, hard drive controller 105, keyboard controller 106, serial interface controller 107, parallel interface controller 108, display controller 109, hard drive 110, keyboard 111, serial peripheral equipment 112, parallel peripheral equipment 113 and display 114. Among the above devices, CPU 101, RAM 102, ROM 103, hard drive controller 105, keyboard controller 106, serial interface controller 107, parallel interface controller 108 and display controller 109 are coupled to the system bus 104. Hard drive 110 is coupled to hard drive controller 105. Keyboard 111 is coupled to keyboard controller 106. Serial peripheral equipment 112 is coupled to serial interface controller 107. Parallel peripheral equipment 113 is coupled to parallel interface controller 108. In addition, display 114 is coupled to display controller 109. It should be understood that the structure as shown in FIG. 1 is only for exemplary purposes rather than any limitation on embodiments of the present invention. In some cases, some devices may be added to or removed from the computer system 100 based on specific situations.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc ROM (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In an existing web application program, generally, according to a capability of a client, a response script is executed on the client as much as possible. The reason is to use the computation capability of the client as much as possible to avoid an excessive pressure on a server end.

Embodiments include a method for a web server transmitting a response to an access request to technically improve a capability that a script is executed on the server end on the existing sever end. Not all scripts may be executed on the server end. It is desired that a load allocation of the scripts is more flexible. To provide more flexibility, the load of the scripts is dynamically allocated between the client and the server end, so that a Web 2.0 program can support broader client devices.

FIG. 2 shows a flowchart of a method for a web server transmitting a response to an access request in accordance with an embodiment. At block S201, an access request for a web application program deployed on a web server is received, wherein a response corresponding to the access request is composed with a script.

The Web 2.0 Internet application program is a web application program which largely uses a response composed based on a script, including JavaScript, Visual Basis Script (VBScript), HTML5 and the like. After this script application program transmits the response script to a client in response to the access request from the client, a web browser of the client is used to parse or operate the response script, and then the client can see the content rendered by the application program. Since JavaScript is widely used, Javascript is used as an example herein to describe embodiments. With respect to the web application composed with other script languages, the principle is the same and repeated description is omitted herein.

At block S202, a test script is transmitted. The test script transmitted to the client by the server can be a very small page, and necessary information can be embedded in the page as required.

In general, the script of the response to the access request of the JavaScript application program mainly includes two types of scripts, one type is a graphical user interface (GUI) script, and the other is a logic script. FIG. 3*a* shows an interface to be rendered on the client by a GUI script, whose length is up to 18 thousand (K) bytes after being parsed to an HTML tag in accordance with an embodiment. For this reason, the parsed HTML tag is not shown in the application text. FIG. 3*b* shows the logic script corresponding to FIG. 3*a* in accordance with an embodiment. FIG. 4 shows an example of a logic script, which is a common verification for a form that includes an input, an input length, a mail format, a password and the like in accordance with an embodiment.

On the web browser end, when the HTML tag is acquired after the GUI script is parsed, a size of the HTML tag may be far bigger than the size of the GUI script file itself, and the parsing operation may be complicated and the consumed time may be long. The consumed time for executing the logic script may be related to a complication degree of the logic script. In addition, the GUI script may be necessary for a client because an interface is to be rendered on the client, while the logic script may not be necessary for the client as it can be executed either on the client or on the server end. Therefore, it can be considered that different manners are adopted for different response scripts for different types of access requests. An aim of transmitting the test script is to detect how many resources of the client can serve the application program, and to check the network situation between the server end and the client, so that how to transmit the response script to the access of the network application program can be decided. The test script may include only the GUI script, or include only the logic script, or it may include both types of scripts. Embodiments do not make any limitation thereto.

At block S203, a response time of the test script is received, and the response time includes a time that the test script is executed in the browser of the client and a time that the test script is transferred over a network. In fact, the time that the test script is executed in the browser of the client may be recorded by the client. The test page captures the time of a clock before and after being executed, and then the time that the test script is executed in the browser of the client may be obtained by subtracting the captured time of the clock before being executed from the captured time of the clock after being executed. Alternatively, another manner can be used, for example, by an indirect calculation manner that includes: recording on the server end, the time A that the test script request is received; the time B that the test result is received next time in the same session; and a time difference T1 between A and B=a script runtime T2+a script download time T3+a result upload time. Generally, the result upload time is relatively smaller and can be omitted, and the script download time is approximately equal to the network transmission time, which can be measured, thus the script runtime T2=T1−T3.

The client returns to the server end at the time that the test script is executed in the browser of the client, as a part of the response of the test page. The time that the test script is executed in the browser of the client indicates how many resources of the client are allocated to the network application. The time that the test script is transferred over the network may indicate the current situation of the network, particularly, whether a bandwidth is large, a network speed is fast, and the like. Further, a start time is recorded on the server end before transmitting, and the noted time is integrated into the test script, so that they are transmitted to the client together. The client records an end time after finishing the reception. The time that the test script is transferred over the network may be acquired by calculating the difference between the start time and the end time, and may be returned to the server end as a part of the response of the test page. Those skilled in the art can also perceive other manners that the time that the test script is transferred over the network may be acquired, for example, by transmitting a speed measurement request to the server end through a speed measurement plug-in of the browser (the client), and storing the measured speed value in a cookie, HTTP header, or URL for being delivered to the server.

At block S204, different responses are transmitted to different types of scripts included in the response corresponding to the access request in accordance with the response time of the test script.

The network speed may have a great influence on the GUI script, and the remaining resources of the client (including the CPU resource and the memory resource) may have a relatively great influence on the logic script. Thus, in one embodiment, in response to the time that the test script is executed in the browser of the client not exceeding a specified threshold and to the time that the test script is transferred over the network not exceeding a specified threshold (i.e., the client device is a first type of device), the script included in the response corresponding to the access request is transmitted. In this embodiment, the remaining resources of the client are sufficient, a computation ability is strong and the network speed is fast, therefore the script included in the response corresponding to the access request is transmitted directly, and processed by the client, so that the entire system is simpler. In an embodiment, the threshold of the network speed is generally about twenty to thirty Kilobytes per second. Thus, a user can freely set the threshold according to the demand of the application. Herein, the sufficient remaining resources of the client and the strong computation ability can be understood as the client being capable of performing a relatively complicated computation, so the GUI script can be parsed on the client to generate the corresponding HTML tag, and the client executes the logic script.

In one embodiment, in response to the time that the test script is executed in the browser of the client exceeding the specified threshold and to the time that the test script is transferred over the network not exceeding the specified threshold (i.e., the client device is a second type of device), after the GUI script included in the response corresponding to the access request is parsed into the HTML tag, the HTML tag is transmitted, and the logic script included in the response corresponding to the access request is executed. In this embodiment, the remaining resources of the client are few, the computation ability is poor, but the network speed is fast, therefore, the content processed by the client shall be decreased, and the content transferred over the network can be increased. Thus, after the GUI script included in the response corresponding to the access request is parsed into the HTML tag, the parsed HTML tag and the logic script included in the response corresponding to the access request are transmitted. Herein, the few remaining resources of the client and poor computation ability can be understood as the client being capable of performing a relatively simple computation, the consumed time of which is acceptable to the user, but the consumed time for performing the complicated operation is unacceptable to the user. In this scenario, the client has no capability of executing the GUI script with a high operation complication degree, but can execute the logic script.

In one embodiment, in response to the time that the test script is executed in the browser of the client not exceeding the specified threshold and to the time that the test script is transferred over the network exceeding the specified threshold (i.e., the client device is a third type of device), the GUI script included in the response corresponding to the access request is transmitted, and the logic script included in the response corresponding to the access request is executed. In this embodiment, where the time that the test script is executed in the browser of the client does not exceed the specified threshold and the time that the test script is transferred over the network exceeds the specified threshold indicates that the remaining resources of the client are sufficient, the computation ability is strong, but the network speed is slow, therefore, the content transferred over the network shall be decreased. Thus, the GUI script included in the response corresponding to the access request is transmitted for being parsed by the client. Also, the logic script included in the response corresponding to the access request is executed on the server end, so that it is not necessary to transmit the logic script, thereby reducing the transferred content.

In one embodiment, in response to the time that the test script is executed in the browser of the client exceeding the specified threshold and to the time that the test script is transferred over the network exceeding the specified threshold (i.e., the client device is a fourth type of device), after the GUI script included in the response corresponding to the access request is parsed into the HTML tag, the HTML tag is transmitted, and the logic script included in the response corresponding to the access request is executed. In this embodiment, the remaining resources of the client are few, the computation ability is poor, and the network speed is slow, therefore, not only the content transferred over the network shall be decreased, but also the content processed by the client shall be decreased. Thus, after the GUI script included in the response corresponding to the access request is parsed into the HTML tag, the HTML tag is transmitted, such that the content processed by the client can be reduced. Although the content transferred over the network is increased, as long as the HTML tag is transmitted, the client can always display some content, avoiding that it looks as if the entire client does not respond in a point view of the client's user. Also, the logic script included in the response corresponding to the access request is executed on the server end, so that it is not necessary to transmit the logic script, thereby reducing not only the transferred content but also the content processed by the client.

FIG. 5 shows spatial positions of four types of clients in a space of a client capability and a network capability in accordance with an embodiment.

In one embodiment, the type of the script is noted in the script of the response corresponding to the access request. A programmer may clearly know the type of the script, that is, whether the script belongs to the GUI script or the logic script. When the programmer writes a program, the program can be written according to the particular format, or a comment statement in a fixed format is used to indicate the type of the script. FIG. 6 shows a segment of a script which schematically uses comment statements to indicate a script type in accordance with an embodiment.

In one embodiment, with respect to the JavaScript, the server can determine and store the types of different segments of the script in the JavaScript file by scanning the JavaScript file when the web application program is deployed. A JavaScript file is the file having the extension name of js. In the scan, comment statements or particular formats can be extracted to determine the types (i.e. the GUI script or the logic script) of the different segments of script noted in a particular format or a comment statement in each JavaScript file and store them. One storage manner is a storage path of all js files may serve as a primary key with a primary hash table whose stored value is a sub-hash table, and the primary key of the sub-hash table is a JavaScript function name whose stored value is a flag of the GUI script or the logic script. When the server end receives the request to access some js files, one sub-hash table can be found by the corresponding primary key of the primary hash table via their file paths, and which JavaScript functions are the GUI script and which are logic script in the js files can be extracted by traversing this sub-Hash table. Those skilled in the art can understand that the storage manner of script types of different script segments in the foresaid Javascript file is only one embodiment, and those skilled in the art can employ other storage manners, such as array, linked list and the like.

In the an embodiment, since the script actually is all character strings, in view of performance optimization, the concatenation can be used, that is, the GUI scripts in the js file are integrated into one script character string, or the logic scripts are integrated into one script character string, and one buffer can be designed to store them, so that they can be directly taken out from the buffer according to a output type when the js file is requested subsequently.

In one embodiment, the test script can be transmitted again in response to receiving the access request of the web application program again, the response time of the test script is received again, the response time includes the time that the test script is executed in the browser of the client and the time that the test script is transferred over the network, and different responses are transmitted to different types of scripts included in the response corresponding to the access request again in accordance with the received response time of the test script. That is to say, the test script can be executed many times, and the most recent result of the test script is used to make a response each time. In another embodiment, the response time of the test script can also be stored, and in response to receiving the access request of the web application program in the same session again, different responses are transmitted to different types of scripts included in the response corresponding to the access request in accordance with the stored response time of the test script. That is, the result of one test can be applied to the whole session, or the test is performed each time of access.

Figure 7:
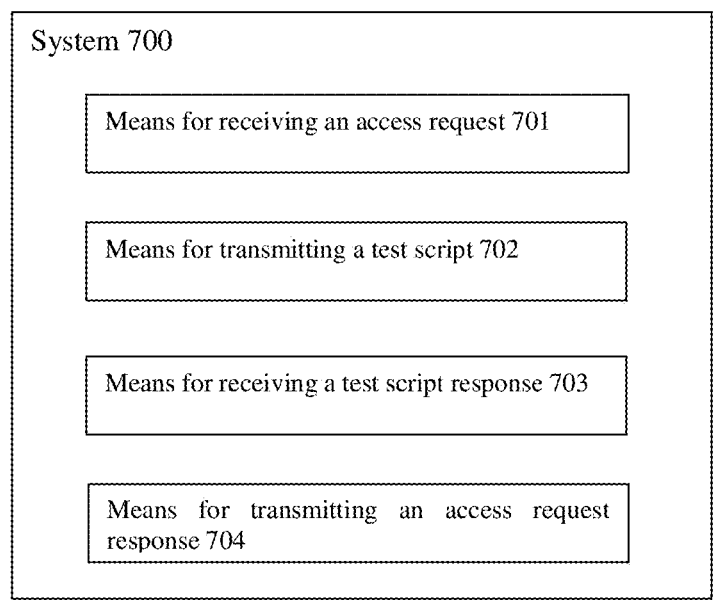
FIG. 7 shows a structural block diagram of a system 700 that a web server transmits a response to an access request in accordance with embodiments described herein.

An embodiment also includes a system for a web server transmitting a response to an access request. FIG. 7 shows a structural block diagram of a system 700 that a Web server transmits a response to an access request in accordance with an embodiment. In accordance with FIG. 7, the system 700 includes: a means for receiving an access request 701, configured to receive an access request for a web application program deployed on a web server, wherein a response corresponding to the access request is composed with a script; a means for transmitting a test script 702, configured to transmit a test script; a means for receiving a test script response 703, configured to receive a response time of the test script, the response time including a time that the test script is executed in a browser of a client and a time that the test script is transferred over a network; and a means for transmitting an access request response 704, configured to transmit different responses to different types of scripts included in the response corresponding to the access request in accordance with the response time of the test script. The different types of scripts may include a GUI script and a logic script. In one embodiment, the type of the script is noted in the script of the response corresponding to the access request. Also, in an embodiment, the script is JavaScript.

In one embodiment, the means for transmitting an access request response is further configured to transmit the script included in the response corresponding to the access request in response to that the time that the test script is executed in the browser of the client does not exceed a specified threshold, and the time that the test script is transferred over the network does not exceed a specified threshold.

In another embodiment, the means for transmitting an access request response is further configured to transmit a parsed HTML tag after the GUI script included in the response corresponding to the access request is parsed into the HTML tag, and transmit the Logic script included in the response corresponding to the access request in response to that the time that the test script is executed in the browser of the client exceeds a specified threshold, and the time that the test script is transferred over the network does not exceed a specified threshold.

In still another embodiment, the means for transmitting an access request response is further configured to transmit the GUI script included in the response corresponding to the access request, and execute the Logic script included in the response corresponding to the access request in response to that the time that the test script is executed in the browser of the client does not exceed a specified threshold, and the time that the test script is transferred over the network exceeds a specified threshold.

In further another embodiment, the means for transmitting an access request response is further configured to transmit an HTML tag after the GUI script included in the response corresponding to the access request is parsed into the HTML tag, and execute the logic script included in the response corresponding to the access request in response to that the time that the test script is executed in the browser of the client exceeds a specified threshold, and the time that the test script is transferred over the network exceeds a specified threshold.

In one embodiment, the system 700 further includes (not shown in FIG. 7): a storage means configured to store the response time of the test script; and wherein the means for transmitting an access request response is further configured to transmit different responses to the different types of scripts included in the response corresponding to the again received access request according to the stored response time of the test script in response to receiving the access request of the web application program in one session again.

In one embodiment, the system 700 further includes (not shown in FIG. 7): a deployment means configured to determine and store the script types of different script segments in the JavaScript file by scanning the JavaScript file in response to that the server deploys the web application program.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a web server to transmit a response to an access request, the method comprising:
   receiving an access request for a web application program deployed on a web server, wherein a response corresponding to the access request is composed with a script;
   transmitting a test script;
   receiving a response time of the test script, the response time including a time that the test script is executed in a browser of a client and a time that the test script is transferred over a network;
   selecting a format of the response to the access request based on the time that the test script is executed in the browser of the client and the time the text script is transferred over the network; and
   transmitting the response to the access request to the client, the response in the selected format.

2. The method according to claim 1, wherein the script includes one or more of a graphical user interface (GUI) script and a logic script.

3. The method according to claim 2, wherein said transmitting the response in the selected format includes:
   parsing the GUI script included in the response corresponding to the access request into an HTML tag, and transmitting the parsed HTML tag and the logic script included in the response corresponding to the access request in response to the time that the test script is executed in the browser of the client exceeding a first specified threshold and to the time that the test script is transferred over the network not exceeding a second specified threshold.

4. The method according to claim 2, wherein said transmitting the response in the selected format includes:
   transmitting the GUI script included in the response corresponding to the access request, and executing the logic script included in the response corresponding to the access request in response to the time that the test script is executed in the browser of the client not exceeding a specified threshold and to the time that the test script is transferred over the network exceeding a specified threshold.

5. The method according to claim 2, wherein the transmitting the response in the selected format includes:
   transmitting an HTML tag after the GUI script included in the response corresponding to the access request is parsed into the HTML tag, and executing the logic script included in the response corresponding to the access request in response to the time that the test script is executed in the browser of the client exceeding a specified threshold and the time that the test script is transferred over the network exceeding a specified threshold.

6. The method according to claim 1, wherein a type of a script is noted in the script of the response corresponding to the access request.

7. The method according to claim 1, said script is a JavaScript.

8. The method according claim 1, wherein said transmitting the response in the selected format includes:
   transmitting the script included in the response corresponding to the access request in response to the time that the test script is executed in the browser of the client not exceeding a first specified threshold and to the time that the test script is transferred over the network not exceeding a second specified threshold.

9. The method according to claim 1, further comprising:
storing the response time of the test script; and
transmitting the response in the selected format in response to receiving the access request of the web application program in one session again.

10. The method according to claim 1, further comprising:
determining and storing the script types of different script segments in a JavaScript file by scanning the JavaScript file in response to the server deploying the web application program.

11. A system for a web server to transmit a response to an access request, the system comprising:
a memory having computer readable computer instructions; and
a processor for executing the computer readable instructions, the instructions including:
receiving an access request for a web application program deployed on a web server, wherein a response corresponding to the access request is composed with a script;
transmitting a test script;
receiving a response time of the test script, the response time including a time that the test script is executed in a browser of a client and a time that the test script is transferred over a network;
selecting a format of the response to the access request based on the time that the test script is executed in the browser of the client and the time the text script is transferred over the network; and
transmitting the response to the access request to the client, the response in the selected format.

12. The system according to claim 11, wherein the script includes one or more of a graphical user interface (GUI) script and a logic script.

13. The system according to claim 12, wherein said transmitting the response in the selected format includes:
parsing the GUI script included in the response corresponding to the access request into an HTML tag, and transmitting the parsed HTML tag and the logic script included in the response corresponding to the access request in response to the time that the test script is executed in the browser of the client exceeding a first specified threshold and to the time that the test script is transferred over the network not exceeding a second specified threshold.

14. The system according to claim 12, wherein said transmitting the response in the selected format includes:
transmitting the GUI script included in the response corresponding to the access request, and executing the logic script included in the response corresponding to the access request in response to the time that the test script is executed in the browser of the client not exceeding a specified threshold and to the time that the test script is transferred over the network exceeding a specified threshold.

15. The system according to claim 12, wherein the transmitting the response in the selected format includes:
transmitting an HTML tag after the GUI script included in the response corresponding to the access request is parsed into the HTML tag, and executing the logic script included in the response corresponding to the access request in response to the time that the test script is executed in the browser of the client exceeding a specified threshold and the time that the test script is transferred over the network exceeding a specified threshold.

16. The system according to claim 11, wherein a type of a script is noted in the script of the response corresponding to the access request.

17. The system according to claim 11, said script is a JavaScript.

18. The system according claim 11, wherein said transmitting the response in the selected format includes:
transmitting the script included in the response corresponding to the access request in response to the time that the test script is executed in the browser of the client not exceeding a first specified threshold and to the time that the test script is transferred over the network not exceeding a second specified threshold.

19. The system of claim 11, wherein the method further comprises:
storing the response time of the test script; and
transmitting the response in the selected format in response to receiving the access request of the web application program in one session again.

20. A computer program product for a web server to transmit a response to an access request, the computer program product comprising:
a computer readable storage medium having computer readable program code embodied therewith, the computer readable program code comprising:
computer readable program code configured to:
receive an access request for a web application program deployed on a web server, wherein a response corresponding to the access request is composed with a script;
transmit a test script;
receive a response time of the test script, the response time including a time that the test script is executed in a browser of a client and a time that the test script is transferred over a network;
selecting a format of the response to the access request based on the time that the test script is executed in the browser of the client and the time the text script is transferred over the network; and
transmit the response to the access request to the client, the response in the selected format.

* * * * *